United States Patent
Yokokawa et al.

(10) Patent No.: US 8,226,528 B2
(45) Date of Patent: Jul. 24, 2012

(54) SHIFT CONTROLLER AND SHIFT CONTROL METHOD FOR AUTOMATIC TRANSMISSION MECHANISM

(75) Inventors: Takahiro Yokokawa, Susono (JP); Yuji Hattori, Gotenba (JP); Shinya Fujimura, Susono (JP); Takaho Kawakami, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 190 days.

(21) Appl. No.: 12/705,132

(22) Filed: Feb. 12, 2010

(65) Prior Publication Data

US 2010/0210413 A1  Aug. 19, 2010

(30) Foreign Application Priority Data

Feb. 13, 2009  (JP) .................................. 2009-031926

(51) Int. Cl.
*F16H 61/662* (2006.01)
(52) U.S. Cl. ................. 477/44; 477/39; 477/40; 477/46
(58) Field of Classification Search .................... 477/37, 477/39, 40, 44, 46
See application file for complete search history.

(56) References Cited

U.S. PATENT DOCUMENTS

| 8,016,718 | B2 * | 9/2011 | Ohshima et al. | 477/50 |
| 2009/0143193 | A1 * | 6/2009 | Ohshima et al. | 477/50 |
| 2010/0167874 | A1 * | 7/2010 | Shirasaka et al. | 477/86 |

FOREIGN PATENT DOCUMENTS

| JP | 3-134368 | 6/1991 |
| JP | 7-280080 | 10/1995 |
| JP | 2001-99308 | 4/2001 |
| JP | 2004-316832 | 11/2004 |
| JP | 2009-19748 | 1/2009 |

* cited by examiner

*Primary Examiner* — Ha D. Ho
(74) *Attorney, Agent, or Firm* — Oblon, Spivak, McClelland, Maier & Neustadt, L.L.P.

(57) ABSTRACT

A shift controller for an automatic transmission mechanism is configured such that when the engine is in a driven state in which the engine is driven by a travel inertia force or the like and an accumulated pressure amount of the accumulator is equal to or less than a predetermined threshold, the excessive engine brake force, which is generated due to the accumulation of at least a portion of the hydraulic pressure generated from the mechanical hydraulic pump in the accumulator, is inhibited or reduced by conducting upshifting that relatively decreases the gear ratio of the automatic transmission mechanism. Therefore, the generation of the excessive engine brake force can be inhibited or reduced even when the engine is in the driven state and pressure accumulation is performed.

7 Claims, 5 Drawing Sheets

SHIFT CONTROLLER AND SHIFT CONTROL METHOD FOR AUTOMATIC TRANSMISSION MECHANISM

INCORPORATION BY REFERENCE

The disclosure of Japanese Patent Application No. 2009-031926 filed on Feb. 13, 2009 including the specification, drawings and abstract is incorporated herein by reference in its entirety.

BACKGROUND OF THE INVENTION

1. Field of the Invention

The invention relates to a shift controller and a shift control method for an automatic transmission mechanism configured to be capable of controlling an engine revolution speed by controlling a gear ratio of the automatic transmission mechanism.

2. Description of the Related Art

In a driven mode in which the engine is driven by power inputted from wheels, for example, when a vehicle decelerates, friction in the engine and a mechanical hydraulic pump driven by the engine becomes a load and the so-called engine brake force is generated. However, of this engine brake force, a load generated as the mechanical hydraulic pump is driven can make the engine brake force too large. Japanese Patent Application Publication No. 3-134368 (JP-A-3-134368) describes an example of configuration designed to reduce the engine brake force. In the configuration described in JP-A-3-134368, an electrically driven high-pressure oil pump that generates a relatively high hydraulic pressure is used to supply hydraulic pressure to a pulley of a V-belt continuously variable transmission mechanism that requires a relatively high hydraulic power, whereas a mechanical low-pressure oil pump that is driven by an engine is used to supply pressurized oil to a hydraulic clutch and a fluid transmission unit that may operate at a relatively low hydraulic pressure, but require pressurized oil at a high flow rate.

Japanese Patent Application Publication No. 2004-316832 (JP-A-2004-316832) describes an invention relating to a configuration having a line pressure circuit system (high hydraulic pressure circuit) into which a relatively high hydraulic pressure is supplied and another circuit system (low hydraulic pressure circuit) that uses a hydraulic pressure of a drain from the line pressure circuit system as a hydraulic pressure source, wherein a discharge pressure of an oil pump driven by the engine is supplied to the line pressure circuit system and a hydraulic pressure reduced by a regulator valve is supplied to the other circuit system (low hydraulic pressure system). Furthermore, Japanese Patent Application Publication No. 7-280080 (JP-A-7-280080) describes a configuration in which an oil pump is driven when upshifting is performed that reduces the gear ratio, and the engine revolution speed is rapidly reduced by the drive resistance of the oil pump.

According to the invention disclosed in JP-A-3-134368, oil pumps of two types, namely, a low-pressure oil pump and a high-pressure oil pump, are provided. Therefore, a hydraulic pressure suitable for a torque converter, a clutch, and a continuously variable transmission mechanism can be supplied, the drive torque of the oil pump as a whole can be reduced, and the power loss or hydraulic pressure deficiency can be prevented or inhibited. However, in the configuration described in JP-A-3-134368, when extra hydraulic pressure on the low hydraulic pressure side is regenerated to an accumulator located on the high hydraulic pressure circuit side, an engine brake force is increased by a (drive) load of the mechanical low-pressure oil pump driven by the engine, for example, when the vehicle is decelerated.

According to the inventions disclosed in JP-A-2004-316832 and JP-A-7-280080, the power inputted from the wheels, for example, when the vehicle is decelerated, is received by an engine or an oil pump driven by the engine. Therefore, the engine brake force is increased by an oil pump load, an un-planned deceleration feeling is created, and drivability can be degraded.

SUMMARY OF THE INVENTION

The invention provides a shift controller and a shift control method for an automatic transmission mechanism that can ensure the preceding drive state when an engine brake force is increased by a drive resistance of a mechanical hydraulic pump.

The first aspect of the invention relates to a shift controller for an automatic transmission mechanism that includes an automatic transmission mechanism for shift transmission of power generated by an engine, a mechanical hydraulic pump that is driven by the engine and generates a relatively low hydraulic pressure, and an accumulator that communicates with the mechanical hydraulic pump and accumulates at least a portion of the hydraulic pressure generated by the mechanical hydraulic pump, and that is configured to perform a control that changes a revolution speed of the engine by controlling a gear ratio of the automatic transmission mechanism, the shift controller including: a driven state determination portion that determines that the engine is in a driven state in which the engine is driven by a travel inertia force; an accumulated pressure amount detection portion that detects that the accumulated pressure amount of the accumulator is equal to or lower than a predetermined value; an accumulated pressure execution portion that increases the hydraulic pressure generated by the mechanical hydraulic pump and that causes the accumulator to accumulate at least a portion of the hydraulic pressure generated by the mechanical hydraulic pump when the engine is determined by the driven state determination portion to be in the driven state and the accumulated pressure amount detection portion detects that the accumulated pressure amount of the accumulator is equal to or lower than the predetermined value; and an upshifting execution portion that reduces a brake force, which is generated when at least a portion of the hydraulic pressure generated by the mechanical hydraulic pump is accumulated in the accumulator, by conducting upshifting that relatively decreases the gear ratio of the automatic transmission mechanism.

According to the first aspect of the invention, the upshifting is conducted by the upshifting execution portion to decrease relatively the gear ratio of the automatic transmission mechanism in a driven state in which the engine is driven by a travel inertia force or the like when the hydraulic pressure generated by the mechanical hydraulic pump is increased and at least a portion of the hydraulic pressure generated by the mechanical hydraulic pump is accumulated in the accumulator. As a result, hydraulic pressure regeneration can be conducted in the driven state of the engine, control is conducted such that decreases relatively the gear ratio of the automatic transmission mechanism, and the revolution speed of the engine is reduced. Therefore, because the revolution speed of the mechanical hydraulic pump is reduced, the increase in the engine brake force caused by the drive resistance of the mechanical hydraulic pump that occurs when the hydraulic pressure is accumulated in the accumulator can be inhibited or reduced. Furthermore, the generation of the excessively large engine brake force can be inhibited or prevented and drivability can be improved. Furthermore, a drop in the vehicle speed caused by the extra large engine brake force can be inhibited or reduced. Therefore re-acceleration is facilitated and fuel consumption is improved.

Further, the automatic transmission mechanism may include a continuously variable transmission mechanism that is installed on the vehicle and can set a gear ratio in a continuously variable manner, the pressure accumulation execution portion may include a portion that calculates a target accumulated pressure amount to be accumulated in the accumulator, and the shift controller may further include a drive resistance calculation portion that calculates a drive resistance of the mechanical hydraulic pump, the drive resistance being generated by the mechanical hydraulic pump and imparting a break force to the vehicle when the target accumulated pressure amount is caused to be accumulated in the accumulator, on the basis of the target accumulated pressure amount calculated by the pressure accumulation execution portion and a revolution speed of the engine at this point in time, and an upshifting amount calculation portion that calculates a gear ratio of the continuously variable transmission mechanism that decreases a revolution speed of the engine so as to reduce a brake torque corresponding to the drive resistance calculated by the drive resistance calculation portion.

With such a configuration, because the automatic transmission mechanism is a continuously variable transmission mechanism that can set a gear ratio in a continuously variable manner, an additional effect can be obtained. Thus, a gear ratio that decreases the revolution speed fraction corresponding to the drive resistance of the mechanical hydraulic pump can be adequately set. Further, in a case where the mechanical hydraulic pump that conducts pressure accumulation in a driven state of the engine is excessively driven by the revolution speed of the engine in the driven state, thereby generating an excessively large engine brake force, the revolution speed of the engine can be decreased by the revolution speed fraction of the engine that causes excessive drive of the mechanical hydraulic pump by controlling the gear ratio of the continuously variable transmission mechanism. Therefore, the excessive drive of the mechanical hydraulic pump in a case where the engine is in the driven state and the hydraulic pressure is accumulated in the accumulator can be inhibited or reduced and the increase in the engine brake force can be inhibited or reduced. Further, the gear ratio of the continuously variable transmission mechanism, that is, the upshifting amount is calculated so as to reduce the engine brake force (brake torque) correspondingly to the drive resistance of the mechanical hydraulic pump that increases the engine brake force, and the gear ratio of the continuously variable transmission mechanism is controlled to the calculated gear ratio. Therefore, the generation of the excessive engine brake force that is caused by the drive resistance of the mechanical hydraulic pump in a case where pressure accumulation is performed can be inhibited or prevented.

The shift controller for an automatic transmission mechanism may further include: an abrupt braking determination portion that determines that the vehicle is in a state of abrupt braking; an upshifting prohibition portion that prohibits the upshifting that relatively decreases the gear ratio of the continuously variable transmission mechanism when the vehicle is determined to be in a state of abrupt braking by the abrupt braking determination portion; a downshift execution portion that relatively increases the gear ratio of the continuously variable transmission mechanism when the vehicle is determined to be in a state of abrupt braking by the abrupt braking determination portion; and a gear ratio detection portion that detects that a gear ratio that has been set is equal to or greater than a predetermined gear ratio when the gear ratio of the continuously variable transmission mechanism is set relatively high by the downshift execution portion.

With such a configuration, when the vehicle is determined to be in a state of abrupt braking by the abrupt braking determination portion, pressure accumulation is performed and the gear ratio of the continuously variable transmission mechanism is relatively increased, that is, downshifting is performed. As a result, in a case where the accumulated pressure amount of the accumulator is equal to or lower than a predetermined value, the pressure is accumulated and an excessive engine brake force is generated by the drive resistance of the mechanical hydraulic pump that accompanies the accumulation of pressure and by the downshifting of the continuously variable transmission mechanism. Therefore, the resultant additional effect is that the accumulated pressure amount can be ensured and the brake force of the vehicle can be increased. Further, because the gear ratio of the continuously variable transmission mechanism is downshifted to a predetermined gear ratio during the abrupt braking, a necessary hydraulic pressure can be provided when the vehicle starts moving again after the abrupt braking, and a large gear ratio necessary when the vehicle starts moving again can be ensured. Therefore, the brake force can be increased during the abrupt braking of the vehicle, the hydraulic pressure and gear ratio necessary when the vehicle starts moving again can be ensured, and the vehicle can be easily caused to start moving again after the abrupt braking.

The shift controller for an automatic transmission mechanism may further include: a drive state variation frequency detection portion that detects that the number of times the engine is repeatedly set in a drive state and a driven state within a predetermined interval is equal to or higher than a predetermined number of times, and an engine revolution speed detection portion that detects that a revolution speed of the engine is equal to or lower than a revolution speed at which a drive resistance generated by the mechanical hydraulic pump can be canceled by performing upshifting that relatively decreases a gear ratio of the continuously variable transmission mechanism, wherein when the number of times the engine is repeatedly set in a drive state and a driven state, which is detected by the drive state variation frequency detection portion, is equal to or higher than the predetermined number of times and an accumulated pressure amount of the accumulator detected by the accumulated pressure amount detection portion is larger than the predetermined value, no hydraulic pressure accumulation is performed in the accumulator.

With such a configuration, in addition to the effect obtained by the first aspect of the invention, no pressure accumulation is performed with the mechanical hydraulic pump when the number of times the engine is repeatedly set in a drive state and a driven state within a predetermined interval is equal to or higher than a predetermined number of times and an accumulated pressure amount of the accumulator detected by the accumulated pressure amount detection portion is equal to or higher than the predetermined value. Further, no pressure accumulation is also performed with the mechanical hydraulic pump when the revolution speed of the engine is equal to or lower than a revolution speed at which the drive resistance of the mechanical hydraulic pump can be cancelled by upshifting. Therefore, when the engine is frequently switched between a drive state and a driven state, it is possible to inhibit or prevent the frequent occurrence of the so-called excessively large engine brake force caused by the mechanical hydraulic pump as the mechanical hydraulic pump that performs pressure accumulation is driven. Further, additional effects produced because the generation of the excessively large engine brake force can be inhibited or prevented include the possibility of effectively ensuring the preceding drive state and improving the vehicle speed controllability.

The continuously variable transmission mechanism may be a belt-type continuously variable transmission mechanism in which a groove width of pulleys onto which a belt is wound is changed by hydraulically moving movable sheaves constituting the pulleys.

With such a configuration, because the continuously variable transmission mechanism is a belt-type continuously variable transmission mechanism in which shifting is performed by changing a groove width of pulleys onto which a belt is wound, a gear ratio can be set in a continuously variable manner by supplying a pressurized oil and changing the amount of pressurized oil supplied to the movable sheaves that change the groove width of the pulleys. The resultant additional effect is that the gear ratio can be adequately set such that reduces a brake torque correspondingly to the drive resistance of the mechanical hydraulic pump.

The downshift execution portion may downshift by setting a gear ratio of the continuously variable transmission mechanism to a gear ratio at which the vehicle can be moved again or a maximum gear ratio.

With such a configuration, when a vehicle is abruptly braked, the gear ratio of the continuously variable transmission mechanism is increased to a gear ratio at which the vehicle can start moving again or a maximum gear ratio. The resultant additional effect is that the vehicle restart performance can be ensured and the vehicle can easily start moving again.

The second aspect of the invention relates to a shift control method for an automatic transmission mechanism for shift transmission of power generated by an engine (1), the method performing a control to change a revolution speed of the engine (1) by controlling a gear ratio of the automatic transmission mechanism. The shift control method for an automatic transmission mechanism includes: determining that the engine is in a driven state in which the engine is driven by a travel inertia force; detecting that an accumulated pressure amount of an accumulator that communicates with a mechanical hydraulic pump that is driven by the engine and generates a relatively low hydraulic pressure and accumulates at least a portion of the hydraulic pressure generated by the mechanical hydraulic pump is equal to or lower than a predetermined value; increasing the hydraulic pressure generated by the mechanical hydraulic pump and causing the accumulator to accumulate at least a portion of the hydraulic pressure generated by the mechanical hydraulic pump when the engine is determined to be in the driven state and the accumulated pressure amount of the accumulator is detected to be equal to or lower than a predetermined value; and conducting upshifting that relatively decreases the gear ratio of the automatic transmission mechanism so as to reduce a brake force generated when at least a portion of the hydraulic pressure generated by the mechanical hydraulic pump is accumulated in the accumulator.

According to the second aspect of the invention, hydraulic pressure regeneration can be conducted in a driven state of the engine and control is conducted so as to decrease relatively the gear ratio of the automatic transmission mechanism and reduce the revolution speed of the engine, similarly to the first aspect of the invention. Therefore, because the revolution speed of the mechanical hydraulic pump is reduced, the increase in the engine brake force caused by the drive resistance of the mechanical hydraulic pump that occurs when the hydraulic pressure is accumulated in the accumulator can be inhibited or reduced. Furthermore, the generation of the excessively large engine brake force can be inhibited or prevented and drivability can be improved. Furthermore, the drop in the vehicle speed caused by the extra large engine brake force can be inhibited or reduced. Therefore re-acceleration is facilitated and fuel consumption is improved.

BRIEF DESCRIPTION OF THE DRAWINGS

The foregoing and further features and advantages of the invention will become apparent from the following description of the example embodiments with reference to the accompanying drawings, wherein like numerals are used to represent like elements, and wherein.

DETAILED DESCRIPTION OF EMBODIMENTS

The invention will be described below with reference to specific examples thereof. A vehicle (Ve) to which the invention can be applied is a vehicle having an internal combustion engine such as a gasoline engine and a diesel engine (referred to hereinbelow as "engine 1") or a hybrid vehicle Ve that uses a combination of the engine 1 and an electric motor. The invention can be applied to a shift controller of any such vehicle Ve provided with a mechanical hydraulic pump that is driven by the engine 1, an accumulator to which at least a portion of hydraulic pressure generated by the mechanical hydraulic pump is supplied and which conducts pressure accumulation, and an automatic transmission mechanism configured to be capable of controlling the revolution speed of the engine 1 by controlling the gear ratio.

Figure 5:
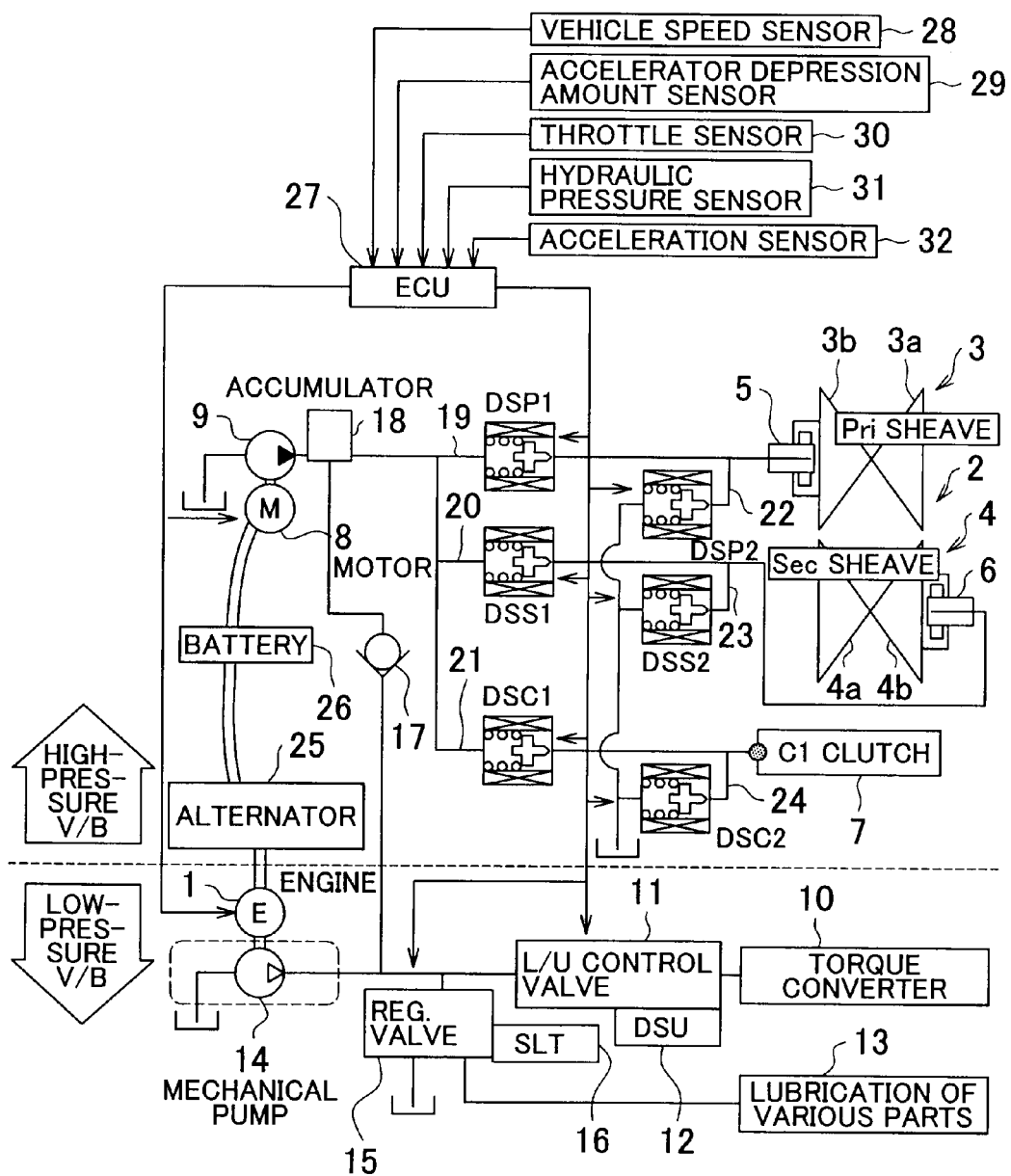
FIG. 5 illustrates schematically the configuration of a vehicle that can apply the shift controller for an automatic transmission mechanism according to the invention.

FIG. 5 illustrates schematically the configuration of the vehicle Ve to which the invention can be applied. A continuously variable transmission mechanism 2 installed on the vehicle Ve shown in FIG. 5 is a conventional belt-type mechanism in which a belt (not shown in the figure) is wound about a drive pulley 3 and a driven pulley 4 and which is configured to change a gear ratio by transmitting a torque between the pulleys 3, 4 and changing a radius of belt winding on the (pulleys 3, 4). More specifically, the pulleys 3, 4 include fixed sheaves 3a, 4a and movable sheaves 3b, 4b that are disposed so that they can be brought closer to and withdrawn from the fixed sheaves 3a, 4a. A V-shaped belt winding groove is formed between the fixed sheaves 3a, 4a and movable sheaves 3b, 4b. Further, hydraulic actuators 5, 6 are provided for moving the movable sheaves 3b, 4b back and forth in the direction of the axial line thereof. A hydraulic pressure that generates a clamping pressure by which the pulleys 3, 4 clamp the belt is supplied to either of the hydraulic actuators 5, 6, for example, the hydraulic actuator 6 in the driven pulley 4, and a hydraulic pressure for shifting by changing a winding radius of the belt is supplied to the other one of the hydraulic actuators 5, 6, for example, the hydraulic actuator 5 in the drive pulley 3.

A C1 clutch 7 for transmitting or cutting off the drive torque is provided at the input side or output side of the continuously variable transmission mechanism 2. The C1 clutch 7 is a clutch in which the transmission torque capacity is set correspondingly to the supplied hydraulic pressure and which is constituted, for example, by a wet multiplate clutch. The continuously variable transmission mechanism 2 and this C1 clutch 7 transmit a torque for moving the vehicle Ve. Further, because the transmission torque capacity is set correspondingly to the hydraulic pressure, a high hydraulic pressure corresponding to the torque is supplied to the hydraulic actuators 5, 6 and the C1 clutch 7. Therefore, the continuously variable transmission mechanism 2 or the hydraulic actuators 5, 6 thereof and the C1 clutch 7 or a hydraulic chamber (not shown in the figure) thereof constitute a high hydraulic pressure reception unit that uses an electric hydraulic pump 9 driven by an electric motor 8 as a hydraulic pressure source.

A torque converter (torcon) 10 including a lockup clutch (not shown in the figure) is provided in a power transmission unit including the continuously variable transmission mechanism 2. The configuration of the torque converter 10 is similar to that is conventional in the related field. In a converter region in which the difference in revolution speed between a pump impeller and a turbine runner is large and a speed ratio is less than a predetermined value, a torque amplification action is produced, whereas in a coupling range in which the revolution speed difference is small and the speed ratio is greater than the predetermined value, the torque converter functions as a fluid coupler that produces no torque amplification action. Further, the lockup clutch is configured to link directly, via a friction plate, a front cover integrated with the pump impeller that is an input member of the lockup clutch with a hub integrated with the turbine runner.

A lock-up (L/U) control valve 11 is provided as a control valve for controlling a lockup hydraulic pressure for bringing the friction plate into contact with the front cover and withdrawing the friction plate from the front cover. The L/U control valve 11 serves to control a hydraulic pressure supply direction to the lockup clutch and the pressure value. Therefore, the L/U control valve 11 is configured to operate under a relatively low hydraulic pressure. The L/U control valve 11 is provided with a lockup engagement solenoid 12 for actuating the L/U control valve 11 and engaging the lockup clutch.

In the power transmission unit that includes the above-described continuously variable transmission mechanism 2 or torque converter 10, there are many so-called sliding parts of heat-generating parts such as bearings or zones of mutual friction contact, and a lubricating oil is supplied to these zones. The necessary amount of lubricating oil may be supplied even under a low pressure to the lubrication portions 13 thereof. Therefore, the lubrication portions 13 and the aforementioned L/U control valve 11 or torque converter 10 form a low hydraulic pressure reception unit that uses as a hydraulic pressure source the mechanical hydraulic pump 14 driven by the engine 1.

A configuration serving to supply a hydraulic pressure to the above-described high hydraulic pressure reception unit or low hydraulic pressure reception unit and release the hydraulic pressure therefrom will be explained below. A pressure regulating valve 15 is provided to regulate the hydraulic pressure discharged from the mechanical hydraulic pump 14, which is driven by the engine 1, to the predetermined pressure. The pressure regulating valve 15 serves to obtain a signal pressure from a linear solenoid 16 and regulate a base pressure for control or the like, and the aforementioned L/U control valve 11 and lubrication portions 13 communicate with the downstream side of the pressure regulating valve. Thus, the configuration is such that the hydraulic pressure reduced by the pressure regulating valve 15 is supplied to the low hydraulic pressure reception unit such as the L/U control valve 11 and lubrication portions 13.

A discharge port of the mechanical hydraulic pump 14 communicates with the accumulator 18 via a check valve 17. The check valve 17 is a unidirectional valve that is open when the pressurized oil flows from the mechanical hydraulic pump 14 to the accumulator 18 and closes to prevent the flow of the pressurized oil in the opposite direction. Further, the accumulator 18 is configured to accommodate an elastic expandable body or a piston pushed by an elastic body in a pressure accumulation chamber and accumulate a hydraulic pressure under a pressure that is equal to or higher than the elastic force of the elastic expandable body or piston. The pressurized oil is supplied from the accumulator 18 to the high hydraulic pressure reception unit. Thus, the aforementioned hydraulic actuator 5 in the drive pulley 3, the hydraulic actuator 6 in the driven pulley 4, and C1 clutch 7 communicate with the accumulator 18. The hydraulic pressure of the high hydraulic pressure reception unit is maintained when the engine is stopped by the hydraulic pressure accumulated in the accumulator 18, and the electric hydraulic pump 9 is driven when the accumulated pressure amount of the accumulator 18 is insufficient.

A supply-side electromagnetic opening-closing valve DSP1 is provided in a supply oil path 19 through which the pressurized oil is supplied from the accumulator 18 to the hydraulic actuator 5 in the drive pulley 3, and the pressurized oil is supplied to the hydraulic actuator 5 and the supply of the pressurized oil is cut off by opening and closing the supply oil path 19 by electrically controlling the supply-side electromagnetic opening-closing valve DSP1. Likewise, a supply-side electromagnetic opening-closing valve DSS1 is provided in a supply oil path 20 through which the pressurized oil is supplied from the accumulator 18 to the hydraulic actuator 6 in the driven pulley 4, and the pressurized oil is supplied to the hydraulic actuator 6 and the supply of the pressurized oil is cut off by opening and closing the supply oil path 20 by electrically controlling the supply-side electromagnetic opening-closing valve DSS1. Further, a supply-side electromagnetic opening-closing valve DSC1 is provided in a supply oil path 21 through which the pressurized oil is supplied from the accumulator 18 to the C1 clutch 7, and the pressurized oil is supplied to the C1 clutch 7 and the supply of the pressurized oil is cut off by opening and closing the supply oil path 21 by electrically controlling the supply-side electromagnetic opening-closing valve DSC1.

A discharge-side electromagnetic opening-closing valve DSP2 is provided in a discharge oil path 22 that links the hydraulic actuator 5 in the drive pulley 3 to a drain site such as an oil pan, and the pressurized oil is discharged from the hydraulic actuator 5 and the discharge of the pressurized oil is cut off by opening and closing the discharge oil path 22 by electrically controlling the discharge-side electromagnetic opening-closing valve DSP2. Likewise, a discharge-side electromagnetic opening-closing valve DSS2 is provided in a discharge oil path 23 that discharges the pressurized oil from the hydraulic actuator 6 in the driven pulley 4, and the pressurized oil is discharged from the hydraulic actuator 6 and the discharge of the pressurized oil is cut off by opening and closing the discharge oil path 23 by electrically controlling the discharge-side electromagnetic opening-closing valve DSS2. Further, a discharge-side electromagnetic opening-closing valve DSC2 is provided in a discharge oil path 24 that discharges the pressurized oil from the C1 clutch 7, and the pressurized oil is discharged from the C1 clutch 7 and the discharge of the pressurized oil is cut off by opening and closing the discharge oil path 24 by electrically controlling the discharge-side electromagnetic opening-closing valve DSC2. These opening-closing valves are so configured as to prevent the pressurized oil from leaking when the valve is closed. The opening-closing valves are configured by poppet valves or check valves.

Where the configuration serving to supply a hydraulic pressure to the above-described high hydraulic pressure reception unit or low hydraulic pressure reception unit and release the hydraulic pressure therefrom is explained, because the mechanical hydraulic pump 14 is coupled to the engine 1, when the engine 1 revolves, the mechanical hydraulic pump 14 similarly revolves and generates a hydraulic pressure. Further, an alternator 25 is coupled similarly to the mechanical hydraulic pump 14 to the engine 1, and when the engine 1 revolves, the alternator 25 similarly revolves and generates electric power. The power generated by the alternator 25 is supplied via a battery 26 to the electric motor 8 and drives the electric motor 8.

The engine 1 can revolve in an autonomous mode when a fuel is supplied to the engine 1 and also in the so-called driven state in which the supply of fuel and ignition are stopped and the engine is forcibly revolved by a travel inertia force of the vehicle Ve. Thus, the mechanical hydraulic pump 14 is revolved and generates a hydraulic pressure in a drive mode of the engine 1 and in a driven state of engine brake. The pressure generated by the mechanical hydraulic pump and the amount of oil are determined according to the specifications of the mechanical hydraulic pump 14, revolution speed, and torque. The hydraulic pressure generated by the mechanical hydraulic pump 14 is regulated by the pressure regulating valve 15 to a predetermined lower hydraulic pressure and then supplied to the torque converter 10 via the L/U control valve 11 and also supplied to the lubrication unit 13.

Since the mechanical hydraulic pump 14 generates a hydraulic pressure corresponding to the operation (drive) state of the engine 1, during abrupt acceleration or when a large engine brake force is generated, the discharge pressure of the mechanical hydraulic pump 14 rises. A high hydraulic pressure generated in such a case opens the check valve 17 and is supplied to the accumulator 18. The check valve 17 is closed when the discharge pressure of the mechanical hydraulic pump 14 is lower than the hydraulic pressure in the accumulator 18. Therefore, the high hydraulic pressure supplied to the accumulator 18 is accumulated therein. A hydraulic pressure that is higher than the highest pressure necessary in the continuously variable transmission mechanism 2 is accumulated in the accumulator 18.

A transmission torque capacity of the continuously variable transmission mechanism 2 is controlled to a capacity that enables a sufficient transmission of the inputted torque, and this capacity is set by a clamping pressure corresponding to the hydraulic pressure supplied to the hydraulic actuator 6 of the driven pulley 4. More specifically, the clamping pressure is controlled correspondingly to a required drive force found based on the accelerator depression amount or throttle opening degree, and when the required drive force is large, the control is conducted to increase the hydraulic pressure supplied to the hydraulic actuator 6 of the driven pulley 4. This control is conducted by opening the supply-side electromagnetic opening-closing valve DSS1 that communicates with the hydraulic actuator 6 of the driven pulley 4 and supply a hydraulic pressure from the actuator 18 to the hydraulic actuator 6. The opening-closing control of the supply-side electromagnetic opening-closing valve DSS1 can be conducted based on the target pressure or target clamping pressure in the hydraulic actuator 6 of the driven pulley 4 and the actual hydraulic pressure in the hydraulic actuator 6. Therefore, a sensor (not shown in the figure) may be provided to detect the actual hydraulic pressure in the hydraulic actuator 6.

Where the clamping pressure is to be decreased based on the decrease of the input torque in the continuously variable transmission mechanism 2, this operation is performed by opening the discharge-side electromagnetic opening-closing valve DSS2 that communicates with the hydraulic actuator 6 of the driven pulley 4. Thus, the electromagnetic coil (not shown in the figure) of the discharge-side electromagnetic opening-closing valve DSS2 is energized, the valve body is withdrawn from the valve seat portion, and the hydraulic actuator 6 is linked to the drain unit. The energizing control of the discharge-side electromagnetic opening-closing valve DSS2 can be also conducted based on the target pressure or target clamping pressure in the hydraulic actuator 6 of the driven pulley 4 and the actual hydraulic pressure in the hydraulic actuator 6.

The gear ratio of the continuously variable transmission mechanism 2 is found from the shift map on the basis of a drive required amount such as an accelerator depression amount and a vehicle speed V or turbine revolution speed. Therefore, a groove width of the drive pulley 3 is controlled to obtain the target gear ratio. This control is conducted by supplying the pressurized oil to the hydraulic actuator 5 in the drive pulley 3 and discharging the pressurized oil therefrom, more specifically by opening and closing the supply-side electromagnetic opening-closing valve DSP1 and discharge-side electromagnetic opening-closing valve DSP2. For example, when the groove width is reduced and belt winding radius is increased to perform upshifting, the supply-side electromagnetic opening-closing valve DSP1 is controlled and opened and the pressurized oil is supplied to the hydraulic actuator 5. Conversely, when the groove width of the drive pulley 3 is increased and belt winding radius is reduced to perform downshifting, the discharge-side electromagnetic opening-closing valve DSP2 is controlled and opened and the pressurized oil is discharged from the hydraulic actuator 5.

Such opening-closing control of the supply-side electromagnetic opening-closing valve DSP1 and discharge-side electromagnetic opening-closing valve DSP2 that control the gear ratio is conducted on the basis of the stroke amount of the movable sheave 3b constituting the drive pulley 3, or results obtained in comparing the actual gear ratio, which is a ratio of the revolution speed of the engine 1, i.e., the input revolution speed to the output revolution speed, with the target gear ratio, or results obtained in comparing the pressure of hydraulic actuators 5, 6 in the pulleys 3, 4.

In a stationary travel state in which the accelerator depression amount and vehicle speed V are maintained almost constant, the control is performed to maintain the constant gear ratio and clamping pressure. In this case, the electromagnetic opening-closing valves of the continuously variable transmission mechanism 2 are controlled to an OFF state, the supply oil paths 19, 20 and discharge oil paths 22, 23 are closed, and the pressurized oil is enclosed in the hydraulic actuators 5, 6. In this state, because the hydraulic pressure is prevented from leaking from the electromagnetic opening-closing valves, the hydraulic pressure in the accumulator 18 can not decrease and the hydraulic pressure is not required to be continuously supplied from the accumulator 18 to maintain the pressure in the hydraulic actuators 5, 6. Therefore, no energy is lost due to leakage of the hydraulic pressure. The leakage of the hydraulic pressure is similarly prevented when the electromagnetic opening-closing valves are controlled to the open state.

Further, when the vehicle Ve travels, the C1 clutch 7 is engaged and a torque is transmitted to the drive wheels (not shown in the figure). Because the C1 clutch 7 transmits a large torque required for the vehicle to travel, a hydraulic pressure is supplied from the accumulator 18 to the C1 clutch 7 when the vehicle Ve travels. Thus, when the vehicle Ve starts moving, the supply-side electromagnetic opening-closing valve DSC1, which is introduced in the supply path 21 of the C1 clutch 7, is energized and opened and a hydraulic pressure is supplied from the accumulator 18 to the C1 clutch 7, thereby engaging the C1 clutch 7. In order to prevent the abrupt engagement of the C1 clutch 7, the supply-side electromagnetic opening-closing valve DSC1 may be repeatedly opened and closed within a short time to increase gradually the engagement pressure of the C1 clutch 7. Alternatively, an accumulator may be provided at the supply side of the C1 clutch 7 and the engagement pressure may be gradually increased correspondingly to the characteristic of the accumulator. Further, when the C1 clutch 7 is released, the discharge-side electromagnetic opening-closing valve DSC2 is ON controlled and the pressure is released from the C1 clutch 7. In this case, in order to release the C1 clutch 7 gradually, the discharge-side electromagnetic opening-closing valve DSC2 may be repeatedly opened and closed within a short time so that the pressure be gradually released.

Similarly to the opening-closing valves relating to the continuously variable transmission mechanism 2, these opening-closing valves relating to the C1 clutch 7 are also of a type such that is closed by pressing a valve body against a valve seat and opened by withdrawing the valve body from the valve seat, and substantially no leakage of hydraulic pressure occurs in the valves. Therefore, the hydraulic pressure can be enclosed in the C1 clutch 7 and the engaged state of the clutch can be maintained, without consuming the hydraulic pressure accumulated in the accumulator 18. Moreover, energy loss caused by leakage of hydraulic pressure can be prevented or inhibited.

An electronic control unit (ECU) 27 is provided to control the gear ratio of the continuously variable transmission mechanism 2 by controlling the aforementioned opening-closing valves DSP1, DSS1, DSC1, DSP2, DSS2, and DSC2, engine 1, and electric motor 8. The ECU 27 is configured around a microcomputer and so as to conduct computations by using the inputted data and data and programs that have been stored in advance and to output the computation results as command signals to various control sites.

A detection signal from a vehicle speed sensor 28 that indicates a vehicle speed V, an accelerator depression amount signal from an accelerator depression amount sensor 29 that detects the depression amount of the accelerator pedal, a throttle sensor signal from a throttle sensor 30 that detects the throttle opening degree, and an actual hydraulic pressure detection signal from a hydraulic pressure sensor 31 that detects the hydraulic pressure accumulated in the accumulator 18 are inputted as data into the ECU 27.

Figure 1:
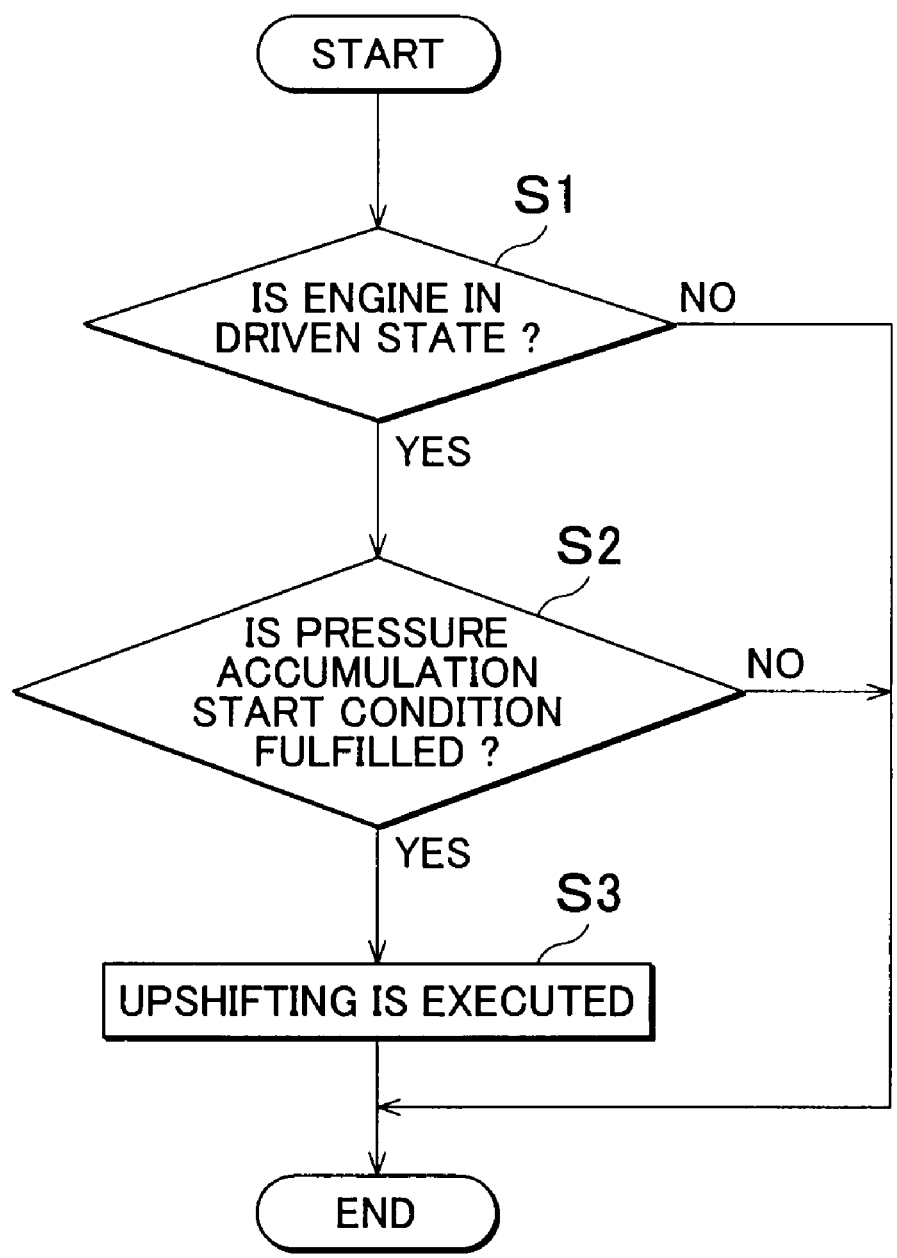
FIG. 1 is a flowchart illustrating schematically an example of control procedure of a shift controller of an automatic transmission mechanism according to the invention.

The shift controller of the automatic transmission mechanism in accordance with the invention conducts control such that when the engine 1 is in a driven state in which the engine is driven by a travel inertia force, the hydraulic pressure generated by the mechanical hydraulic pump 14 can be supplied to the accumulator 18 via the check valve 17 and accumulated. FIG. 1 shows the control flowchart. In the control example shown in FIG. 1, first, it is determined whether the engine 1 is driven by a travel inertia force or the like (step S1). The determination of the driven state of the engine 1 is conducted by computational processing performed by the ECU 27 on the basis of the vehicle speed V detected by the vehicle speed sensor 28 and a signal detected by the accelerator operation amount sensor 29 or throttle sensor 30. The computation contents can be as follows. For example, when it is determined that there is no drive requirement with respect to the engine 1 because the vehicle speed V detected by the vehicle speed sensor 28 is equal to or higher than a predetermined threshold and the signal detected by the accelerator depression amount sensor 29 or throttle sensor 30 is equal to or lower than a predetermined threshold, the engine 1 is determined to be in the driven state and the positive determination is made in step S1. By contrast, when it is determined there is a drive requirement with respect to the engine 1, the engine 1 is assumed not to be in the driven state in which the engine is driven by the travel inertia force and the negative determination is made. Further, the aforementioned thresholds can be found in advance by tests or simulation.

In a case where the determination of step S1 is positive, that is, when it is determined that the engine 1 is in the driven state, it is detected, after the control of step S1 or parallel thereto, whether the accumulated pressure amount of the accumulator 18 is equal to or lower than a predetermined threshold (step S2). As for the accumulated pressure amount of the accumulator 18, the hydraulic pressure of the accumulation chamber of the accumulator is detected by the aforementioned hydraulic pressure sensor 31, and when the detected hydraulic pressure is equal to or lower than the predetermined threshold, the pressure accumulation start condition is assumed to be fulfilled and a positive determination is made in step S2. Where the positive determination is made in step S2, the pressure regulating valve 15 is controlled and the hydraulic pressure generated by the mechanical hydraulic pump 14 is supplied to the accumulator 18 via the check valve 17 and accumulated. By contrast, where the hydraulic pressure in the hydraulic chamber detected by the hydraulic pressure sensor 31 is greater than the predetermined threshold, the accumulation of pressure is assumed to be unnecessary or impossible and a negative determination is made in step S2. The aforementioned threshold can be found in advance by tests or simulation.

Following the control of step S2, the upshifting of the belt-type continuously variable transmission mechanism 2 is executed in order to reduce the revolution speed of the engine 1 and the revolution speed of the engine 1 is thereby reduced (step S3). The control that relatively decreases the gear ratio of the belt-type continuously variable transmission mechanism 2 is conducted to reduce the drive resistance occurring when the hydraulic pressure generated in the mechanical hydraulic pump 14 is accumulated in the accumulator 18, that is, the so-called friction component that generates an excessively large engine brake force. Therefore, where the upshifting of the belt-type continuously variable transmission mechanism 2 is executed, the revolution speed of the engine 1 is decreased in response to the operation of the belt-type continuously variable transmission mechanism 2, that is, the revolution speed of the mechanical hydraulic pump 14 is decreased. Further, the drive resistance of the mechanical hydraulic pump 14 that is generated when the hydraulic pressure generated in the mechanical hydraulic pump 14 is accumulated is reduced.

The shift controller for an automatic transmission mechanism in accordance with the invention is configured so that the mechanical hydraulic pump 14 is driven and pressure accumulation regeneration is performed when the engine 1 is in a driven state in which the engine is driven by a travel inertia force or the like. When pressure accumulation is performed, the drive resistance of the mechanical hydraulic pump 14 becomes a factor generating an excessively large engine brake force. Therefore, the control is conducted to decrease the revolution speed of the engine 1 and reduce the drive resistance of the mechanical hydraulic pump 14, which is driven by the engine 1, by executing the upshifting to reduce relatively the gear ratio of the belt-type continuously variable transmission mechanism 2. Further, the pressurized oil discharged by the mechanical hydraulic pump 14 is supplied to the accumulator 18 via the check valve 17 and accumulated by closing the pressure regulating valve 15. Therefore, a relatively high hydraulic pressure can be accumulated in the accumulator 18, without driving the electric hydraulic pump 9. Further, because upshifting of the belt-type continuously variable transmission mechanism 2 can inhibit or reduce the generation of an excessively large engine brake force, the drop of the vehicle speed V of the vehicle Ve can be reduced, reacceleration can be increased, and fuel consumption can be improved.

Where a negative determination is made in the aforementioned step S1, the engine 1 is assumed not to be in the driven state in which the engine is driven by a travel inertia force and the routine is temporarily ended. Further, where a negative determination is made in step S2, it is assumed that the accumulated pressure amount of the accumulator 18 is greater than the predetermined threshold and that further accumulation is unnecessary or impossible, and the routine is temporarily ended.

Figure 2:
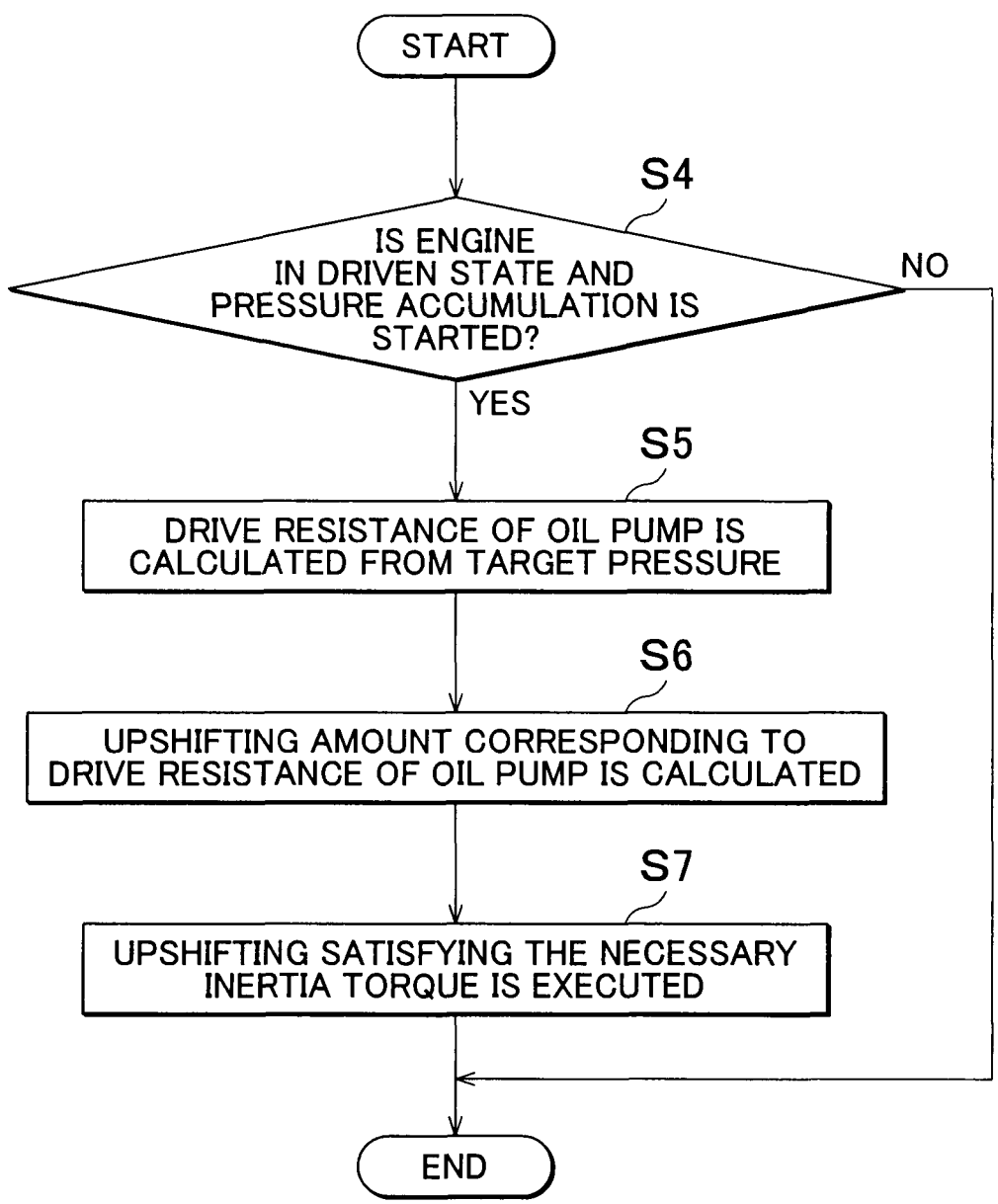
FIG. 2 is a flowchart illustrating schematically another example of control procedure of a shift controller of an automatic transmission mechanism according to the invention.

In the above-described control example, the drive resistance can be reduced by upshifting the belt-type continuously variable transmission mechanism 2. FIG. 2 shows an example in which control is conducted to calculate more accurately the drive resistance (friction) generated when the mechanical hydraulic pump 14 is driven and pressure accumulation is performed and to inhibit or reduce the generation of an excessively large engine brake force by the drive resistance.

FIG. 2 shows a control flowchart serving to explain this example of control. First, it is determined whether the engine 1 is in a driven state in which the engine is driven by a travel inertia force and whether the accumulated pressure amount of the accumulator 18 is equal to or less than a predetermined threshold (step S4). This step S4 corresponds to step S1 and step S2 shown in FIG. 1. When the engine 1 is in a driven state and the accumulated pressure amount of the accumulator 18 is equal to or less than the predetermined threshold, a positive determination is made in step S4. By contrast, where the engine 1 is in a drive state and the accumulated pressure amount of the accumulator 18 is greater than the predetermined threshold, a negative determination is made.

Following the control of step S4 or parallel thereto, a target accumulated pressure amount that will be accumulated in the accumulator 18 is calculated. The drive resistance of the mechanical hydraulic pump 14 generated when the target accumulated pressure amount is accumulated in the accumulator 18, that is, the drive resistance of the mechanical hydraulic pump 14 that causes the generation of the excessively large engine brake force, is calculated on the basis of the target accumulated pressure amount and the revolution speed of the engine 1 at the point of time in which the target accumulated pressure amount is calculated (step S5).

The gear ratio of the belt-type continuously variable transmission mechanism 2 is then calculated that can reduce a brake torque correspondingly to the calculated drive resistance (step S6). Then, the upshifting amount calculated in step S6 is executed (step S7). Because the resistance (also referred to as friction) occurring as the mechanical hydraulic pump 14 is driven when pressure accumulation is performed is a factor causing the so-called excessively large engine brake force, the control is co conducted as to cancel the deceleration component caused by this resistance by decreasing relatively the gear ratio of the belt-type continuously variable transmission mechanism 2 by this resistance (friction) fraction, that is, by conducting upshifting.

Therefore, the resistance (friction) occurring when the engine 1 is in a driven state and pressure accumulation is performed by the mechanical hydraulic pump 14 is canceled by conducting upshifting that decrease relatively the gear ratio of the belt-type continuously variable transmission mechanism 2. Therefore, the generation of an excessively large engine brake force that appears when the mechanical hydraulic pump 14 is driven and pressure accumulation is performed can be adequately inhibited or reduced.

When a negative determination is made in the aforementioned step S4, it is assumed that the engine 1 is in a drive state, the accumulated pressure amount of the accumulator 18 is larger than a predetermined threshold, and pressure accumulation is unnecessary or impossible, and the routine is temporarily ended.

Further, in a case where the vehicle Ve is abruptly braked, an engine brake force using the friction of the engine 1 and also the resistance (friction) generated when the mechanical hydraulic pump 14 is driven and pressure accumulation is conducted may be actively used in addition to braking performed with brakes. Thus, the control is conducted such as to generate the so-called excessively large engine brake force and increase the braking force by the resistance (friction) of the mechanical hydraulic pump 14 that accompanies pressure accumulation. An example of such control is shown in FIG. 3.

Figure 3:
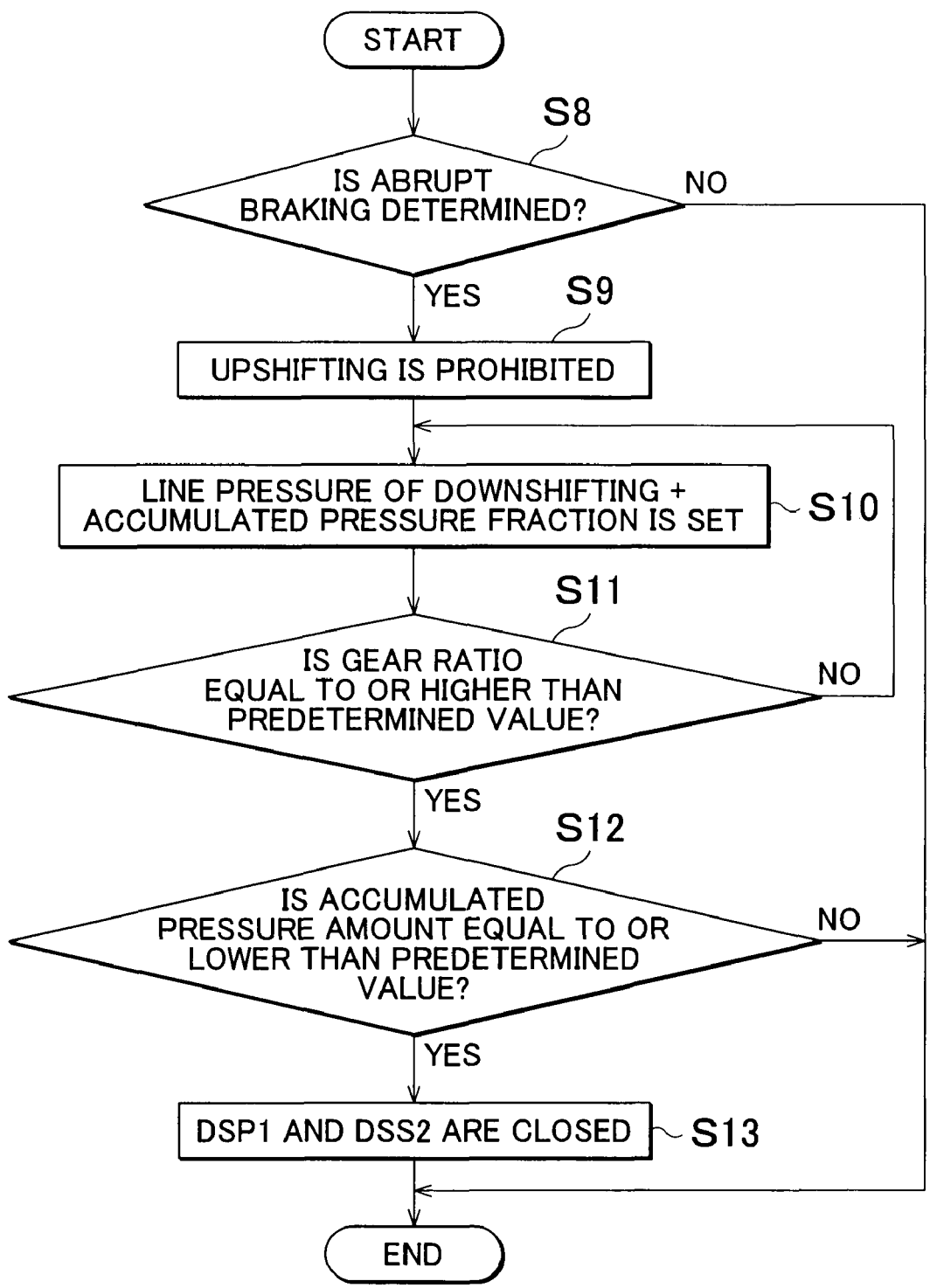
FIG. 3 is a flowchart illustrating schematically yet another example of control procedure of a shift controller of an automatic transmission mechanism according to the invention.

FIG. 3 is a flowchart for explaining an example of the aforementioned control. First, it is determined whether the vehicle Ve is in a state of abrupt braking (step S8). This is done by determining whether a deceleration G of the vehicle Ve detected by the acceleration sensor 32 is equal to or greater than a predetermined threshold. When the vehicle Ve is determined to be in the state of abrupt braking because the deceleration G detected by the acceleration sensor 32 is equal to or greater than a predetermined threshold, a positive determination is made in step S8. By contrast, when the deceleration G is determined to be equal to or less than the predetermined threshold, it is assumed that the vehicle Ve has not been abruptly braked and a negative determination is made. The aforementioned threshold can be found in advance by tests or simulation.

Following the control of step S8 or parallel thereto, upshifting that relatively decreases the gear ratio of the belt-type continuously variable transmission mechanism 2 is prohibited (step S9). Following the control of step S9 or parallel thereto, downshifting that increases the gear ratio of the belt-type continuously variable transmission mechanism 2 is conducted. Further, in addition to regulating the pressure to a line pressure corresponding to the gear ratio that has been set, when the accumulated pressure amount of the accumulator 18 is equal to or less than the predetermined threshold, the pressure regulating valve 15 is controlled and the hydraulic pressure generated by the mechanical hydraulic pump 14 is supplied to the accumulator 18 via the check valve 17 and accumulated (step S10). The downshifting in step S10 is conducted to a gear ratio at which the vehicle Ve can be stopped and restarted or to a maximum gear ratio of the belt-type continuously variable transmission mechanism 2 installed on the vehicle Ve.

Following the control of step S10, it is determined whether the gear ratio of the belt-type continuously variable transmission mechanism 2 that has been downshifted is equal to or greater than a preset gear ratio at which the vehicle can be caused to start moving again (step S11). The determination is made by detecting a difference in the revolution speed between the drive pulley 3 and the driven pulley 4 with a revolution speed sensor (not shown in the figure). Where it is determined that the gear ratio of the belt-type continuously variable transmission mechanism 2 is equal to or greater than a preset gear ratio at which the vehicle can be caused to start moving again, a positive determination is made in step S11. By contrast, where it is determined that the gear ratio of the belt-type continuously variable transmission mechanism 2 is not equal to or greater than a preset gear ratio at which the vehicle can be caused to start moving again, the processing flow returns to step S10 and control is conducted to downshift to the gear ratio at which the vehicle can be caused to start moving again.

Following the control of step S11 or parallel thereto, it is determined whether the accumulated pressure amount of the accumulator 18 is equal to or lower than a predetermined threshold. Thus, it is determined whether a hydraulic pressure necessary when the vehicle Ve is abruptly braked and then caused to start moving again is ensured in the accumulator 18 (step S12). When the accumulated pressure amount of the accumulator 18 is determined to be equal to or lower than the predetermined threshold, a positive determination is made in step S12. By contrast, when the accumulated pressure amount of the accumulator 18 is determined not to be equal to or lower than the predetermined threshold, the necessary accumulated pressure amount is assumed to be ensured and a negative determination is made in step S12.

Following the control of step S12, the electromagnetic opening-closing valves DSP1 and DSS2 are closed (step S13). Thus, the supply-side electromagnetic opening-closing valve DSP1 of the drive pulley 3 and the discharge-side electromagnetic opening-closing valve DSS2 of the driven pulley 4 are closed, and the gear ratio of the belt-type continuously variable transmission mechanism 2 is thus fixed. Because the electromagnetic opening-closing valves DSP1 and DSS2 are closed, the pressurized oil supplied from the mechanical hydraulic pump 14 is not supplied to the supply-side electromagnetic opening-closing valve DSP1 of the drive pulley 3. Therefore, the pressurized oil is easier supplied to the accumulator 18 and accumulated therein.

Therefore, in addition to the engine brake force that appears following the downshift, a high line pressure is set to provide for a case in which the vehicle Ve is stopped and then caused to start moving again and a resistance of the mechanical hydraulic pump 14 that follows pressure accumulation is added to the brake force of the vehicle Ve. Therefore, the deceleration G at the time of abrupt braking of the vehicle Ve can be increased. Further, because the braking force can be increased, a stopping distance till the vehicle Ve is stopped by braking can be shortened.

Where a negative determination is made in the aforementioned step S8, the vehicle Ve is assumed not to be in a state of abrupt braking and the routine is temporarily ended. Further, where a negative determination is made in the aforementioned step S11, a gear ratio suitable for the case in which the vehicle Ve is stopped and then caused to start moving again is assumed to be ensured and the routine is temporarily ended. Where a negative determination is made in the aforementioned step S12, the necessary hydraulic pressure is assumed to be accumulated in the accumulator 18 and the routine is temporarily ended.

In the above-described control examples, in a case with a high repetition frequency of a driven state in which the engine 1 is driven by a travel inertia force or the like and a drive state in which the drive request is issued, for example, by depressing an accelerator pedal and the vehicle is driven autonomously, the pressure accumulation frequency rises and the controllability of the vehicle speed V can be degraded. Further, where the revolution speed of the engine 1 is low, for example, when the engine 1 is driven close to an autonomous revolution speed, the upshifting can be impossible with the above-described control. Furthermore, an excessively large engine brake force can be generated each time the accelerator ON/OFF is repeated and the controllability of the vehicle speed V can be degraded. For this reason, for example, when the number of ON/OFF operations (switching) of the accelerator within a predetermined interval exceeds a predetermined number of times and there is a margin of the accumulated pressure amount of the accumulator 18, the control may be performed such that no pressure accumulation is conducted. An example of such control is shown in FIG. 4.

Figure 4:
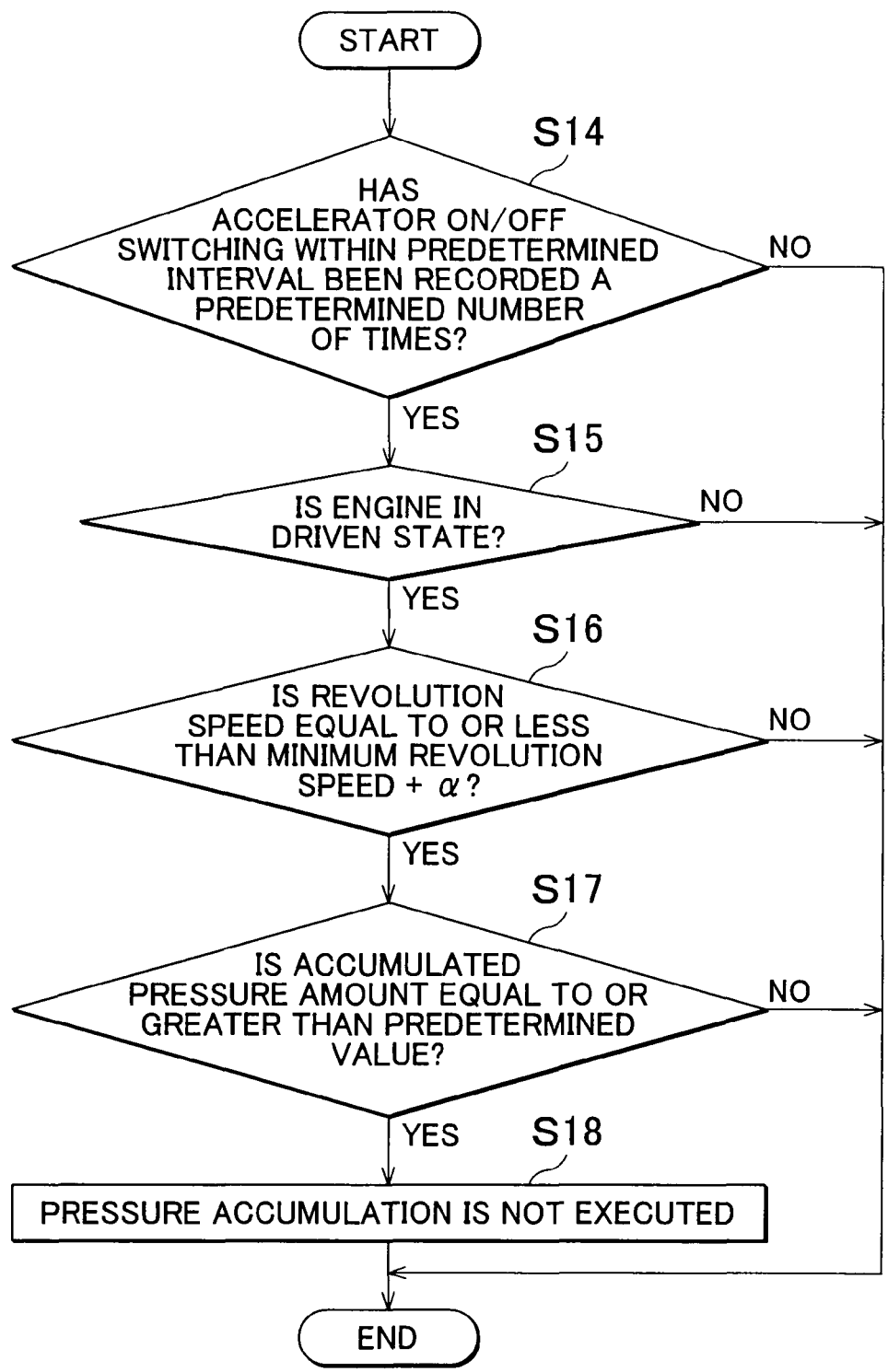
FIG. 4 is a flowchart illustrating schematically still another example of control procedure of a shift controller of an automatic transmission mechanism according to the invention.

FIG. 4 is a control flowchart for explaining an example of the aforementioned control. First, it is determined whether the number of ON/OFF operations (switching) of the accelerator detected within a predetermined interval is equal to or greater than a predetermined number (step S14). This is determined by determining whether the number of signals detected by the accelerator depression amount sensor 29 within a predetermined interval is equal to or greater than a predetermined threshold. Where the number of ON/OFF operations (switching) of the accelerator detected by the accelerator depression amount sensor 29 within a predetermined interval is determined to be equal to or greater than the threshold, a positive determination is made in step S14. By contrast, where the number of ON/OFF operations (switching) of the accelerator detected by the accelerator depression amount sensor 29 within a predetermined interval is determined to be less than the threshold, it is assumed that the above-described irregularities do not occur and a negative determination is made in step S14. These thresholds can be found in advance by tests or simulation.

Following the control of step S14 or parallel thereto, it is determined whether the engine 1 is in a driven state in which the engine is driven by a travel inertia force (step S15). When the engine 1 is in the driven state, a positive determination is made in step S15. By contrast, where the engine 1 operates autonomously, a negative determination is made in step S15.

Following the control of step S15, it is determined whether the revolution speed of the engine 1 is equal to or less than a revolution speed obtained by adding a revolution speed fraction as a result of upshifting by which the brake torque can be reduced correspondingly to the drive resistance generated by the mechanical hydraulic pump 14 to the autonomous revolution speed of the engine 1 necessary for the vehicle Ve to travel (step S16). Thus, it is determined whether the vehicle is in a travel state in which the drive resistance of the mechanical hydraulic pump 14 can be canceled by upshifting that relatively decreases the gear ratio of the belt-type continuously variable transmission mechanism 2. In a case where the revolution speed of the engine 1 is equal to or less than the revolution speed at which the drive resistance generated by the mechanical hydraulic pump 14 can be canceled by upshifting, a positive determination is made in step S16. By contrast, where the revolution speed of the engine 1 is greater than the revolution speed at which the drive resistance generated by the mechanical hydraulic pump 14 can be canceled by upshifting, a negative determination is made in step S16.

Following the control of step S16 or parallel thereto, it is determined whether the accumulated pressure amount of the accumulator 18 is greater than a predetermined threshold (step S17). Here, the determination relating to the accumulated pressure amount of the accumulator 18 is made by determining whether the hydraulic pressure detected by the hydraulic pressure sensor 31 is greater than a predetermined threshold. The threshold of the hydraulic pressure can be found in advance by tests or simulation. More specifically, the threshold is a hydraulic pressure that makes it possible to change the gear ratio of the belt-type continuously variable transmission 2. In a case where the accumulated pressure amount of the accumulator 18 is greater than the predetermined threshold, a positive determination is made in step S17. By contrast, where the accumulated pressure amount of the accumulator 18 is equal to or less than the predetermined threshold, it is assumed that the belt-type continuously variable transmission 2 cannot be shifted by the hydraulic pressure accumulated in the accumulator 18 and a negative determination is made in step S17.

Following the control of step S17, pressure accumulation in the accumulator 18 caused by the mechanical hydraulic pump 14 is restricted (step S18). Thus, by conducting no pressure accumulation in the accumulator 18, the frequency of pressure accumulation in the accumulator 18 can be inhibited or reduced.

Therefore, when the accelerator is repeatedly ON/OFF operated and the engine 1 is repeatedly switched between the drive state and the driven state, the generation of the excessively large engine brake force caused by pressure accumulation can be inhibited or reduced. Further, because the generation of the excessively large engine brake force can be inhibited, the controllability of the vehicle speed V can be improved. Moreover, because the reacceleration caused by the excessive drop in the vehicle speed V can be reduced, fuel consumption can be improved.

In a case where a negative determination is made in the aforementioned step S14, it is assumed that the irregularities caused by ON/OFF switching of the accelerator do not occur and the routine is temporarily ended. Further, where a negative determination is made in the aforementioned step S15, the engine 1 is assumed to operate in an autonomously driven state and the routine is temporarily ended. Moreover, where a negative determination is made in the aforementioned step S16, it is assumed that the drive resistance of the mechanical hydraulic pump 14 cannot be canceled by upshifting and the routine is ended. In addition, where a negative determination is made in the aforementioned step S17, a necessary hydraulic pressure is assumed to be accumulated in the accumulator 18 and the routine is temporarily ended.

The relationship between the above-described specific examples and the invention will be explained in a simple manner. Functional means for executing step S1 and step S15 shown in the figures may be assumed to correspond to the driven state determination portion of the invention. Functional means for executing step S2, step S12, and also step S17 may be assumed to correspond to the accumulated pressure amount detection portion of the invention. Functional means for executing step S3 and step S7 may be assumed to correspond to the upshifting execution portion of the invention. Functional means for executing step S5 may be assumed to correspond to the drive resistance calculation portion of the invention. Functional means for executing step S6 may be assumed to correspond to the upshifting amount calculation portion of the invention. Functional means for executing step S8 may be assumed to correspond to the abrupt braking determination portion of the invention. Functional means for executing step S9 may be assumed to correspond to the upshifting prohibition portion of the invention. Functional means for executing step S10 may be assumed to correspond to the downshift execution portion of the invention. Functional means for executing step S11 may be assumed to correspond to the gear ratio detection portion of the invention. Functional means for executing step S14 may be assumed to correspond to the drive state variation frequency detection portion of the invention. Functional means for executing step S16 may be assumed to correspond to the engine revolution speed detection portion of the invention.

The invention is not limited to the shift controller for a belt-type continuously variable transmission mechanism and can be also applied to a shift controller for a toroidal continuously variable transmission mechanism While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. A shift controller for an automatic transmission mechanism that includes an automatic transmission mechanism for shift transmission of power generated by an engine, a mechanical hydraulic pump that is driven by the engine and generates a relatively low hydraulic pressure, and an accumulator that communicates with the mechanical hydraulic pump and accumulates at least a portion of the hydraulic pressure generated by the mechanical hydraulic pump, the shift controller for the automatic transmission mechanism being configured to perform a control that changes a revolution speed of the engine by controlling a gear ratio of the automatic transmission mechanism, the shift controller for the automatic transmission mechanism, comprising:

a driven state determination portion that determines whether the engine is in a driven state in which the engine is driven by a travel inertia force;

an accumulated pressure amount detection portion that detects whether an accumulated pressure amount of the accumulator is equal to or lower than a predetermined value;

an accumulated pressure execution portion that increases the hydraulic pressure generated by the mechanical hydraulic pump and that causes the accumulator to accumulate at least a portion of the hydraulic pressure generated by the mechanical hydraulic pump when the engine is determined by the driven state determination portion to be in the driven state and the accumulated pressure amount of the accumulator is detected by the accumulated pressure amount detection portion to be equal to or lower than the predetermined value; and an upshifting execution portion that reduces a brake force, which is generated when at least a portion of the hydraulic pressure generated by the mechanical hydraulic pump is accumulated in the accumulator, by conducting upshifting that relatively decreases the gear ratio of the automatic transmission mechanism.

2. The shift controller for the automatic transmission mechanism according to claim 1, wherein:

the automatic transmission mechanism includes a continuously variable transmission mechanism that is installed on a vehicle and set a gear ratio in a continuously variable manner, and the pressure accumulation execution portion includes a portion that calculates a target accumulated pressure amount to be accumulated in the accumulator, the shift controller further comprising:

a drive resistance calculation portion that calculates a drive resistance of the mechanical hydraulic pump, the drive resistance being generated by the mechanical hydraulic pump and imparting a brake force to the vehicle when the target accumulated pressure amount is caused to be accumulated in the accumulator, on the basis of the target accumulated pressure amount calculated by the pressure accumulation execution portion and a revolution speed of the engine at this point in time, and an upshifting amount calculation portion that calculates a gear ratio of the continuously variable transmission mechanism that decreases a revolution speed of the engine so as to reduce a brake torque corresponding to the drive resistance calculated by the drive resistance calculation portion.

3. The shift controller for the automatic transmission mechanism according to claim 2, further comprising:

an abrupt braking determination portion that determines whether the vehicle is in a state of abrupt braking;

an upshifting prohibition portion that prohibits the upshifting that relatively decreases the gear ratio of the continuously variable transmission mechanism when the vehicle is determined to be in the state of abrupt braking by the abrupt braking determination portion;

a downshift execution portion that relatively increases the gear ratio of the continuously variable transmission mechanism when the vehicle is determined to be in the state of abrupt braking by the abrupt braking determination portion; and a gear ratio detection portion that detects whether a gear ratio that has been set is equal to or greater than a predetermined gear ratio when the gear ratio of the continuously variable transmission mechanism is set relatively high by the downshift execution portion.

4. The shift controller for the automatic transmission mechanism according to claim 2, further comprising:

a drive state variation frequency detection portion that detects whether the number of times the engine is repeatedly set in a drive state and a driven state within a predetermined interval is equal to or higher than a predetermined number of times, and an engine revolution speed detection portion that detects whether a revolution speed of the engine is equal to or lower than a revolution speed at which a drive resistance generated by the mechanical hydraulic pump can be canceled by performing upshifting that relatively decreases a gear ratio of the continuously variable transmission mechanism, wherein when the number of times the engine is repeatedly set in a drive state and a driven state, which is detected by the drive state variation frequency detection portion, is equal to or higher than the predetermined number of times and an accumulated pressure amount of the accumulator detected by the accumulated pressure amount detection portion is larger than the predetermined value, hydraulic pressure accumulation in the accumulator is not performed.

5. The shift controller for the automatic transmission mechanism according to claim 2, wherein the continuously variable transmission mechanism is a continuously variable transmission mechanism including a belt in which a groove width of pulleys onto which the belt is wound is changed by hydraulically moving movable sheaves constituting the pulleys.

6. The shift controller for the automatic transmission mechanism according to claim 3, wherein the downshift execution portion downshifts by setting a gear ratio of the continuously variable transmission mechanism to a gear ratio at which the vehicle start moving again or a maximum gear ratio.

7. A shift control method for an automatic transmission mechanism for shift transmission of power generated by an engine, the method performing a control to change a revolution speed of the engine by controlling a gear ratio of the automatic transmission mechanism, the shift control method for the automatic transmission mechanism, comprising:

determining whether the engine is in a driven state in which the engine is driven by a travel inertia force;

detecting whether an accumulated pressure amount of an accumulator that communicates with a mechanical hydraulic pump that is driven by the engine and generates a relatively low hydraulic pressure and accumulates at least a portion of the hydraulic pressure generated by the mechanical hydraulic pump is equal to or lower than a predetermined value;

increasing the hydraulic pressure generated by the mechanical hydraulic pump and causing the accumulator to accumulate at least a portion of the hydraulic pressure generated by the mechanical hydraulic pump when the engine is determined to be in the driven state and the accumulated pressure amount of the accumulator is detected to be equal to or lower than the predetermined value; and conducting upshifting that relatively decreases a gear ratio of the automatic transmission mechanism so as to reduce a brake force generated when at least a portion of the hydraulic pressure generated by the mechanical hydraulic pump is accumulated in the accumulator.

* * * * *